United States Patent
Yoshida

(10) Patent No.: US 8,145,952 B2
(45) Date of Patent: Mar. 27, 2012

(54) STORAGE SYSTEM AND A CONTROL METHOD FOR A STORAGE SYSTEM

(75) Inventor: Masahiro Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 12/691,985

(22) Filed: Jan. 22, 2010

(65) Prior Publication Data

US 2010/0199131 A1    Aug. 5, 2010

(30) Foreign Application Priority Data

Jan. 30, 2009   (JP) ................................ 2009-020005

(51) Int. Cl.
*G06F 11/00* (2006.01)
(52) U.S. Cl. ........................................................ 714/43
(58) Field of Classification Search .................. 714/2, 3, 714/4.1, 4.11, 4.2, 4.3, 4.4, 5.1, 6.11, 6.2, 714/6.21, 6.3, 22, 39, 42, 43, 47.1, 48, 56
See application file for complete search history.

(56) References Cited

U.S. PATENT DOCUMENTS

| | | | |
|---|---|---|---|
| 7,003,687 B2 * | 2/2006 | Matsunami et al. | 714/4.5 |
| 7,058,953 B2 * | 6/2006 | Willard et al. | 718/105 |
| 7,519,741 B2 * | 4/2009 | Khandelwal et al. | 710/8 |
| 7,818,630 B2 * | 10/2010 | Hendrickson et al. | 714/47.1 |
| 2004/0205381 A1 | 10/2004 | Sakai | |
| 2005/0120259 A1 | 6/2005 | Aoki | |
| 2006/0107125 A1 * | 5/2006 | Hsu et al. | 714/100 |
| 2006/0117211 A1 * | 6/2006 | Matsunami et al. | 714/4 |
| 2006/0117215 A1 | 6/2006 | Yanagisawa | |
| 2007/0283107 A1 | 12/2007 | Ozaki et al. | |
| 2008/0270851 A1 * | 10/2008 | Ochi et al. | 714/47 |

FOREIGN PATENT DOCUMENTS

| | | |
|---|---|---|
| JP | 07-141117 | 6/1995 |
| JP | 2000-089984 | 3/2000 |
| JP | 2002-278909 | 9/2002 |
| JP | 2004-252692 | 9/2004 |
| JP | 2005-149281 | 6/2005 |
| JP | 2006-134207 | 5/2006 |
| JP | 2007-328396 | 12/2007 |

OTHER PUBLICATIONS

Japanese Office Action for corresponding Japanese Application 2009-020005; dated Jan. 25, 2011.

* cited by examiner

*Primary Examiner* — Nadeem Iqbal
(74) *Attorney, Agent, or Firm* — Staas & Halsey LLP

(57) ABSTRACT

A storage system includes a storage device for storing data, a pair of adapters connected with the storage device, each of the adapters transmitting and receiving the data to and from the storage device respectively. The storage system includes a controller, connected with the adapters, for collecting performance information indicating performance of each of the adapters, comparing the collected performance information of the adapters with each other, and detecting a suspected adapter that is suspected of having a performance failure on the basis of a result of the comparison.

10 Claims, 14 Drawing Sheets

FIG. 6

| Total Time | Idle Time |
|---|---|
| 1000 | 50 |

FIG. 7

| DA No | Busy Ratio |
|---|---|
| 121a | 95 |
| 122a | 10 |
| 121b | 5 |
| 122b | 1 |
| 121c | 1 |
| 122c | 5 |
| 121d | 15 |
| 122d | 5 |

FIG. 8

| DA No | Busy Ratio |
|---|---|
| 121a | 95 |
| 122a | 10 |
| 121b | 5 |
| 122b | 1 |
| 121c | 1 |
| 122c | 5 |
| 121d | 15 |
| 122d | 5 |

⇒

| DA No | Failure Detection |
|---|---|
| 121a | 1 |
| 122a | 0 |
| 121b | 0 |
| 122b | 0 |
| 121c | 0 |
| 122c | 0 |
| 121d | 0 |
| 122d | 0 |

STORAGE SYSTEM AND A CONTROL METHOD FOR A STORAGE SYSTEM

CROSS-REFERENCE TO RELATED APPLICATIONS

This application is based upon and claims the benefit of priority of the prior Japanese Patent Application No. 2009-20005, filed on Jan. 30, 2009, the entire contents of which are incorporated herein by reference.

FIELD

The embodiments discussed herein are related to a storage system, a control method for controlling a storage system, and a storage medium that stores a control program for controlling a storage system.

BACKGROUND

Hitherto, a disk array apparatus provided with a plurality of disks has been used as a data input and output apparatus in some cases. In such a disk array apparatus, the disks are subjected to redundancy. Accordingly, even if a predetermined number of disks are broken, data is not lost. Furthermore, access paths to the disks in the disk array apparatus are also subjected to redundancy. Even if a predetermined number of access paths are disabled, the disks may be accessed.

The redundancy of access paths will now be described. The disk array apparatus includes a control module that controls various processes, such as a read process. The control module is connected to a disk through a device adapter (hereinafter, "DA") that controls an access path to a disk. Specifically, when the control module is connected to disks through a plurality of DAs, access paths to the disks are subjected to redundancy. When receiving an access request from an upper apparatus, the control module selects an access path to access a disk.

As the number of disks provided for the disk array apparatus increases, the number of DAs increases in proportion thereto. In particular, as a maximum storage capacity of such a disk array apparatus has increased to the order of petabytes, the number of disks has increased. This leads to an increase in the number of DAs. The increase in the number of DAs results in an increase of the risk of DA failure. Typically, DAs provided for the disk array apparatus are periodically subjected to status monitoring, e.g., an operation check. The statuses of the DAs are monitored at any time in order to early detect a DA in an abnormal condition and normalize the status of the DA.

Recently, there have been proposed techniques of determining whether or not command processing time exceeds a predetermined threshold value to degrade (reduce) components constituting the disk array apparatus.

For example, reference documents are Japanese Laid-Open Patent Publication Nos. 2004-252692 and 2000-89984.

According to the above-described techniques, however, a performance failure may not be detected appropriately. Specifically, although an operation failure or a process failure may be detected according to the above-described techniques, a performance failure, e.g., an abnormal performance value of a DA, may not be detected. The reason is as follows. As for a DA having a performance failure, its performance is lower than the normal one but the DA may operate with the performance which is not recognized as being in an abnormal condition. In the case where the DA operates while being not recognized as failed, even when data access delay due to the performance failure occurs, a process which will be completed within a prescribed period may not be finished within the period. That is, a system may not operate as intended. It is therefore important to detect a DA having a performance failure.

Even in the use of the above-described techniques of determining whether or not command processing time exceeds the threshold value to degrade DAs which serve as components, a DA performance failure may not be detected appropriately. Specifically, whether a DA has a performance failure may be inherently determined in consideration of another point of view, for example, whether the DA is temporarily under high load due to an external factor. However, it is complicated and difficult to make such a determination. It is difficult to appropriately detect a DA having a performance failure using the above-described techniques.

SUMMARY

According to an aspect of the embodiment, a storage system includes a storage device for storing data, a pair of adapters connected with the storage device, each of the adapters transmitting and receiving the data to and from the storage device respectively, and a controller, connected with the adapters, for collecting performance information indicating performance of each of the adapters, comparing the collected performance information of the adapters with each other, and detecting a suspected adapter that is suspected of having a performance failure on the basis of a result of the comparison.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram explaining an access monitoring unit.

FIG. 7 is a diagram explaining a performance information collecting section.

FIG. 8 is a diagram explaining a suspected DA detecting section.

DESCRIPTION OF EMBODIMENTS

Preferred embodiments of the present technique will be explained with reference to accompanying drawings. A storage system, a control method for controlling a storage system, and a control program disclosed in the present technique will be described below. The storage system, the control method, and the control program disclosed in the present technique are not restricted to embodiments.

(Explanations of Main Terms)

Main terms used in the following embodiments will now be described. The "disk array apparatus" is an apparatus that is provided with a plurality of disks constituting a RAID (Redundant Arrays of Inexpensive Disks) group and controls accesses to the disks by a host, serving as an upper apparatus. The term "RAID" means a technique of managing a plurality of disks as a single disk. The "disk array apparatus" controls the disks constituting the RAID group to increase throughput, failure tolerance, and the like.

Such a "disk array apparatus" accesses a disk through a DA that controls an access path to the disk. Typically, the "disk array apparatus" is connected to the disks through a plurality of DAs. Even if a predetermined number of DAs fail, the "disk array apparatus" may access the disks.

Although the "disk array apparatus" may be suitable for a system which desires high throughput and failure tolerance, the following problem has occurred. As the number of DAs provided for the "disk array apparatus" increases, the possibility of DA failure rises. Accordingly, a mechanism for early detecting a DA failure and normalizing the state of the "disk array apparatus" is needed. As for DA failures, however, it is difficult to early detect a performance failure.

The reason will now be described in brief. A performance failure is different from an operation failure and a process failure. The performance failure means a failure in which the performance of a DA exhibits an abnormal value but the DA operates while being not recognized as failed. A concrete example will now be explained. It is assumed that a DA has any trouble, such as a hardware failure. When the hardware failure is not so serious that the DA is disabled, the DA normally operates though its performance deteriorates. In this case, the DA seems to operate normally. It is therefore difficult to early detect a performance failure caused by a hardware failure as described above.

If such a performance failure may be caused again with high probability while the DA seems to operate normally, this may lead to a fatal failure in the system which desires high throughput and failure tolerance. Accordingly, it is desirable to early detect such a performance failure as well as an operation failure and a process failure.

(Schematically Explanations of a Disk Array Apparatus)

Figure 1:
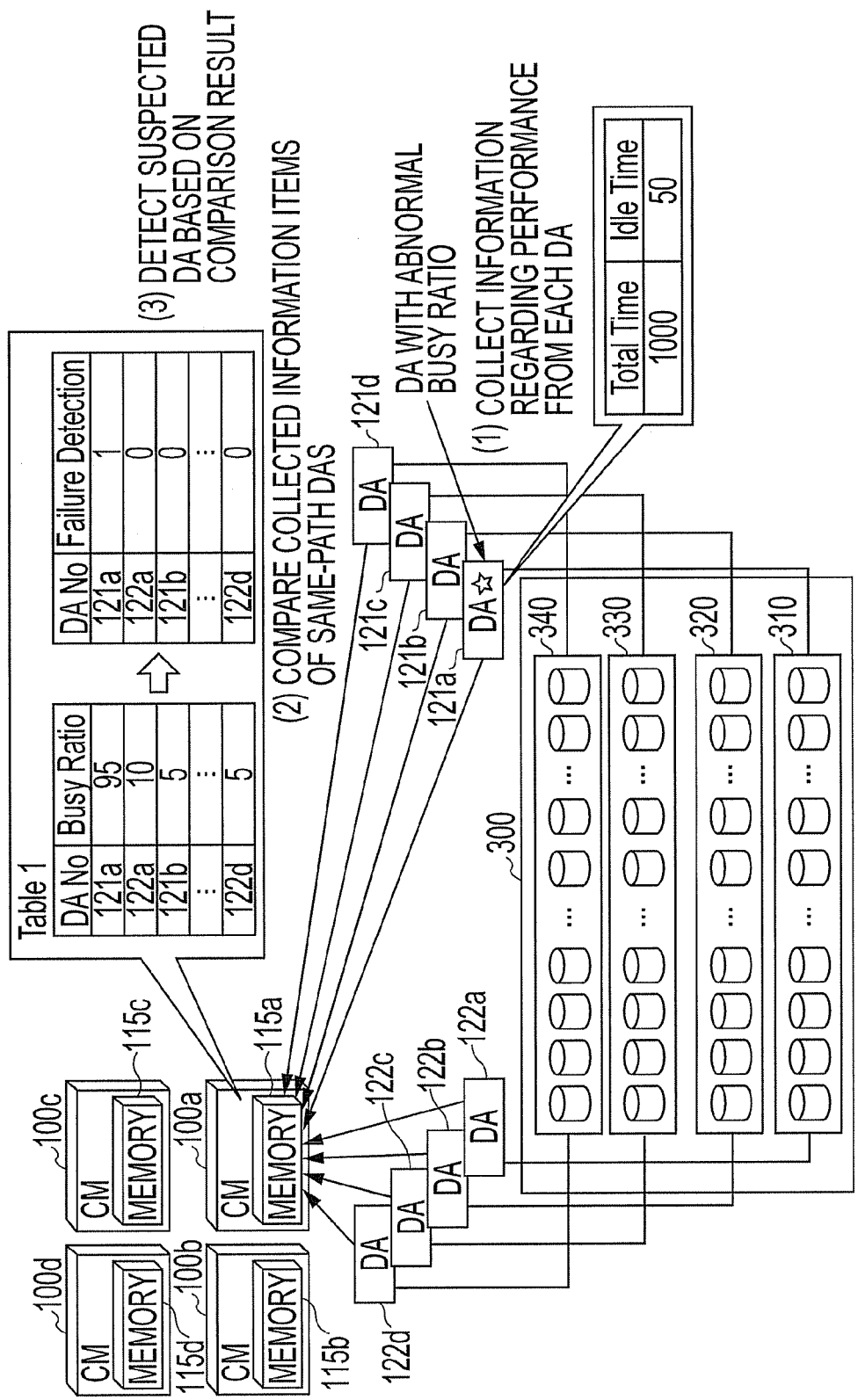
FIG. 1 is a diagram schematically explaining a disk array apparatus according to a first embodiment of the present technique.

A disk array apparatus according to a first embodiment of the present technique will be schematically described below with reference to FIG. 1. FIG. 1 is a diagram schematically explaining the disk array apparatus according to the first embodiment.

Referring to FIG. 1, the disk array apparatus, indicated at 10, includes controller modules (hereinafter, "CMs") 100a to 100d, DAs 121a to 121d and 122a to 122d, and a device enclosure (hereinafter, "DE") unit 300. The CMs 100a to 100d, each controlling a read process and a write process, include memories 115a to 115d, respectively. Since the CMs 100a to 100d perform similar processes, the CM 100a of the CMs 100a to 100d will be mainly described below. The DE unit 300 includes DEs 310 to 340 each of which is provided for a plurality of disks.

In FIG. 1, the CM 100a is connected to the DE unit 300 via the DAs 121a to 121d and 122a to 122d. Specifically, the CM 100a is connected to the DE 310 via the DAs 121a and 122a and is also connected to the DE 320 via the DAs 121b and 122b. Similarly, the CM 100a is connected to the DE 330 via the DAs 121c and 122c and is also connected to the DE 340 via the DAs 121d and 122d.

In other words, the disk array apparatus 10 illustrated in FIG. 1 uses duplicated access paths to the respective disks. Even if one DA fails, the disks may be accessed. For example, if either the DA 121a of the DA 122a fails, the disk array apparatus 10 may access the disks provided for the DE 310.

With this arrangement, each DA in the first embodiment provides information regarding its performance. The first embodiment will be described on the assumption that each DA cumulatively counts for idle time as an example of information regarding its performance.

Referring to FIG. 1, the DA 121a cumulatively counts 50 milliseconds as idle time out of total time (1000 milliseconds). This means that the cumulative idle time measured from the time when the DA 121a started idle time measurement until a lapse of 100 milliseconds is 50 milliseconds. Similarly, each of the other DAs 121b to 121d and 122a to 122d counts its idle time.

The disk array apparatus 10 collects information regarding performance (idle time in the first embodiment) from each of the DAs 121a to 121d and 122a to 122d (see (1) in FIG. 1). Referring to FIG. 1, the CM 100a of the disk array apparatus 10 directs the DAs 121a to 121d and 122a to 122d to transmit data indicating "total time" and data indicating "idle time". Thus, the CM 100a acquires the data indicating "total time" and the data indicating "idle time" from each of the DAs 121a to 121d and 122a to 122d.

The CM 100a calculates an operating ratio (busy ratio) of each of the DAs 121a to 121d and 122a to 122d on the basis of the acquired "total time" and "idle time". Referring to FIG. 1, the CM 100a calculates "95" as a busy ratio of the DA 121a, "10" as that of the DA 122a, and "5" as that of the DA 121b, as illustrated in Table 1. Similarly, the CM 100a calculates busy ratios of the DAs 121c, 121d and 122b to 122d. "DA No" illustrated in Table 1 in FIG. 1 indicates a reference number assigned to each of the DAs 121a to 121d and 122a to 122d. For example, the DA assigned "121a" as a "DA No" is the DA 121a.

The CM 100a compares the calculated busy ratios of the DAs controlling the same access path (see (2) in FIG. 1). The "DAs controlling the same access path" mean DAs each of which may be an access path when the CM 100a accesses a predetermined DE. In the following description, a plurality of DAs controlling the same access path will be called "same-path DAs". For instance, the DAs 121a and 122a control the access path from the CM 100a to the DE 310 in FIG. 1. Accordingly, the DAs 121a and 122a are the "same-path DAs". Similarly, the DAs 121b and 122b are "same-path DAs", the DAs 121c and 122c are "same-path DAs", and the DAs 121d and 122d are also "same-path DAs".

An exemplary process of comparing the busy ratios will now be described. For example, the CM 100a compares the busy ratios of two DAs, serving as same-path DAs, to determine whether there is a difference therebetween such that the busy ratio of one DA is more than n times (n is a predetermined value set separately, e.g., a value ranging from 2 to 5) the busy ratio of the other DA. As a result of comparison, when there is a difference therebetween such that the busy ratio of one DA is more than n times that of the other one, the CM 100a detects the DA having the higher busy ratio as a suspected DA that is suspected of having a performance failure (see (3) in FIG. 1).

Such detection will now be described with reference to FIG. 1. It is assumed that the above-described n is "5". Referring to FIG. 1, the CM 100a compares the busy ratios of the DAs 121a and 122a, serving as the same-path DAs. As a result of comparison, the CM 100a determines that the busy ratio, "95", of the DA 121a is more than five times the busy ratio, "10", of the DA 122a. The CM 100a detects the DA 121a as a suspected DA on the basis of the comparison result.

As described above, in the disk array apparatus 10 according to the first embodiment, since performance information items of same-path DAs are compared, a DA having a performance failure may be appropriately detected.

Appropriate detection of a DA having a performance failure will be concretely described below. In the case where access paths are subjected to redundancy by a plurality of DAs, the busy ratios of the DAs may be substantially uniform. The reason is that the CM 100a selects an access path so that the busy ratios of the respective DAs are substantially uniform. Accordingly, a DA having a remarkably high busy ratio may have any trouble (hardware failure or the like) and perform an extra process (e.g., retry process) other than normal processes. Repeating such an excess process may cause a performance failure. Accordingly, the disk array apparatus 10 according to the first embodiment compares the busy ratios of DAs controlling the same access path and detects a DA having a remarkably high busy ratio as a suspected DA. Consequently, the disk array apparatus 10 according to the first embodiment may appropriately detect a DA having a performance failure.

In the above-described case, each access path is duplicated. The disk array apparatus according to the present embodiment of the present technique is not limited to the case but is also applied to a case where each access path is triplicated. The following description includes the case where each access path is triplicated or more.

(Entire Configuration of the Disk Array Apparatus)

Figure 2:
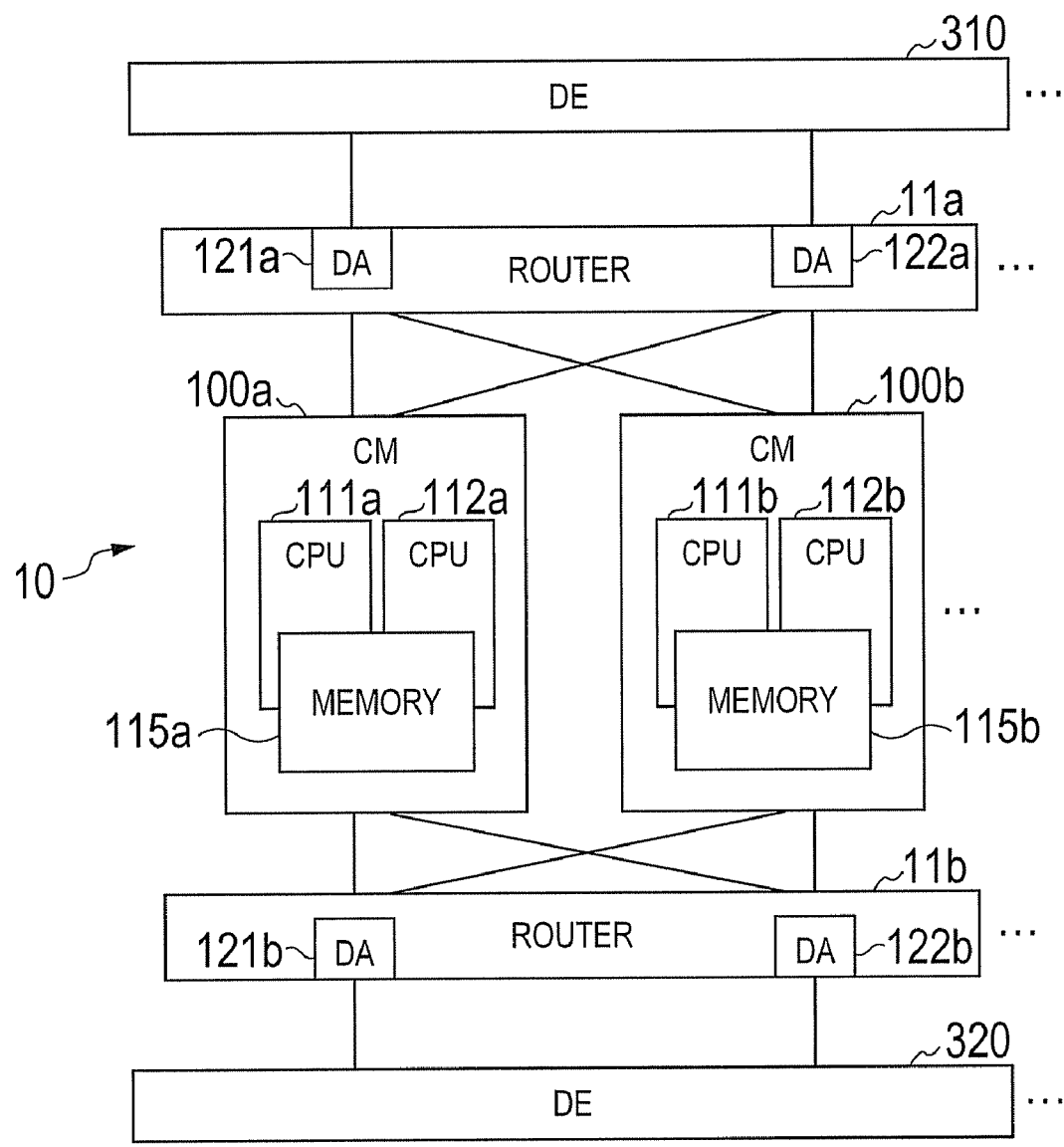
FIG. 2 is a block diagram illustrating an example of the entire configuration of the disk array apparatus.
Figure 3:
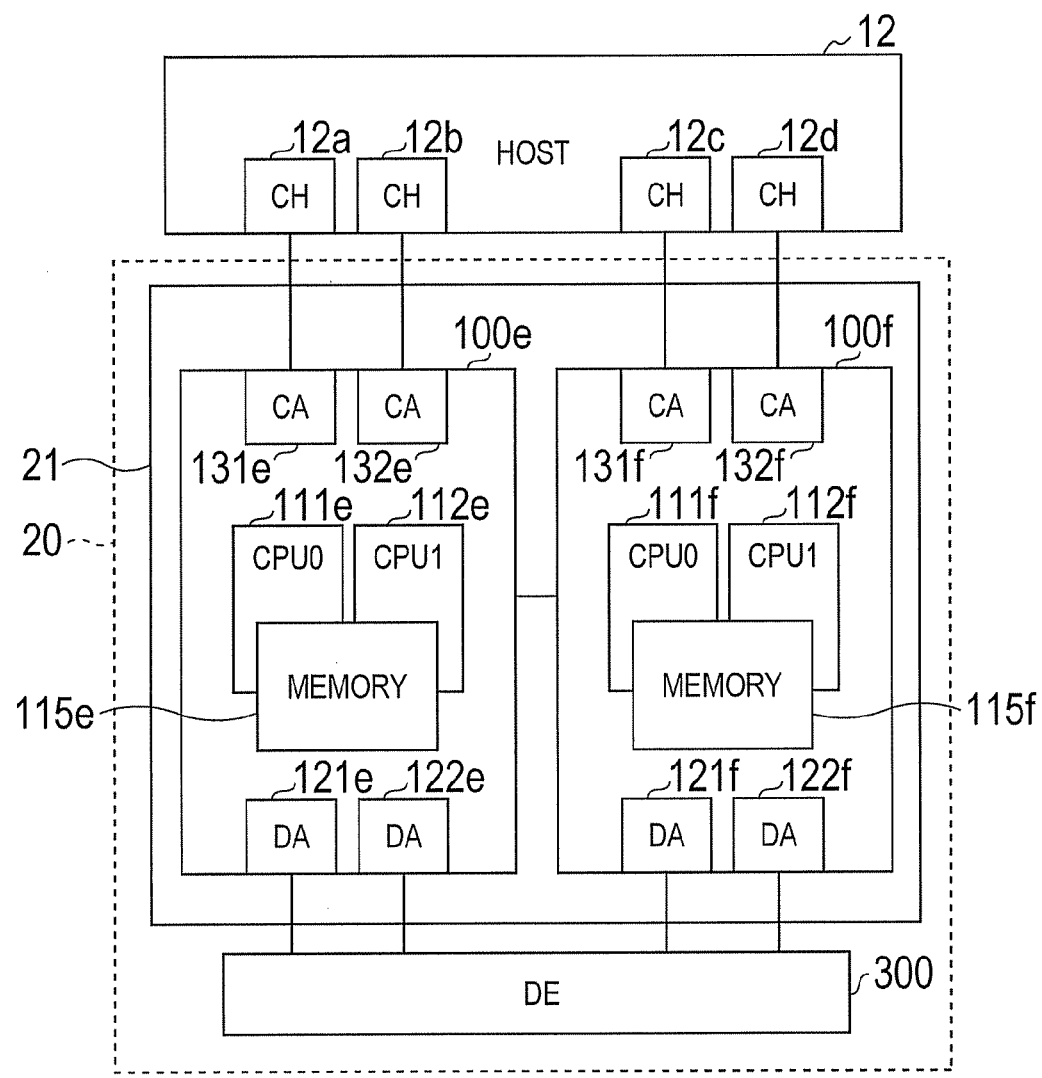
FIG. 3 is a block diagram illustrating an example of the entire configuration of another disk array apparatus.
Figure 4:
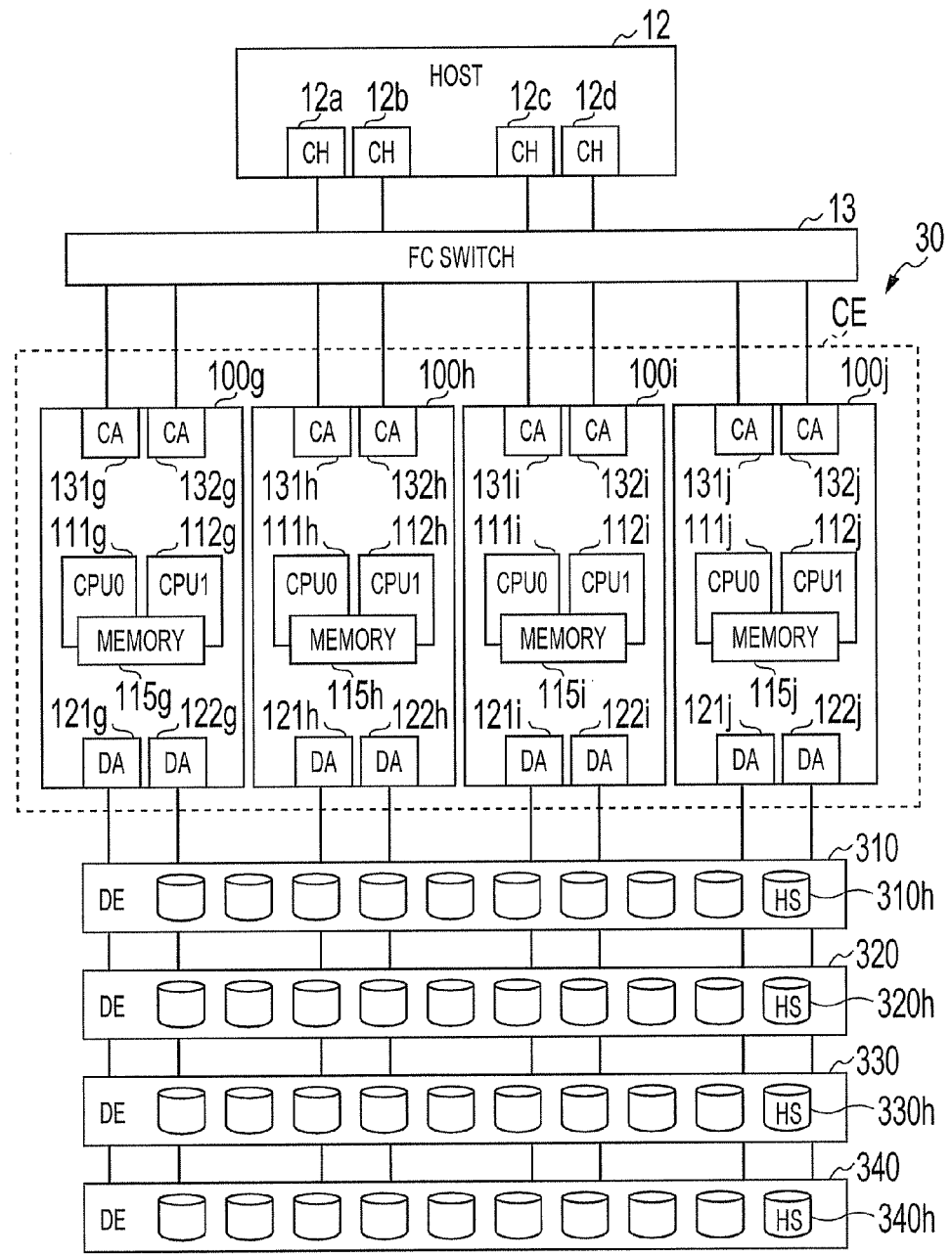
FIG. 4 is a block diagram illustrating an example of the entire configuration of another disk array apparatus.

The entire configuration of the disk array apparatus according to the first embodiment will now be described with reference to FIGS. 2 to 4. FIGS. 2 to 4 are block diagrams illustrating exemplary entire configurations of disk array apparatuses.

Referring to FIG. 2, the disk array apparatus 10 includes the CMs 100a, 100b, . . . . It is assumed that the disk array apparatus 10 includes two or more CMs used for operation to assure redundancy. The CMs 100a and 100b mainly include components (CPUs 111a, 112a, 111b, and 112b and memories 115a and 115b) for controlling the disk array apparatus 10 and communication modules for communicating with an upper apparatus (host), which is not illustrated in FIG. 2, respectively.

The disk array apparatus 10 is connected to the DE 310 via a router 11a and is also connected to the DE 320 via a router 11b, as illustrated in FIG. 2. The router 11a includes the DAs 121a and 122a. The router 11b includes the DAs 121b and 122b.

Specifically, the CMs 100a and 100b each access the DE 310 via either the DA 121a or the DA 122a. In addition, the CMs 100a and 100b each access the DE 320 via either the DA 121b or the DA 122b. The disk array apparatus 10 illustrated in FIG. 2 uses duplicated access paths to the disks in this manner.

The configuration of the disk array apparatus disclosed in the present technique is not limited to the exemplary configuration illustrated in FIG. 2 bus is also applied to another configuration. FIGS. 3 and 4 each illustrate an example of the entire configuration of another disk array apparatus.

The entire configuration of a disk array apparatus 20 illustrated in FIG. 3 will now be described. Referring to FIG. 3, a chassis of the disk array apparatus 20 is divided into a segment for a controller enclosure (CE) unit 21 and another segment for the DE unit 300. The CE unit 21 includes CMs 100e and 100f.

Referring to FIG. 3, the disk array apparatus 20 is connected to channels (hereinafter, "CHs") 12a to 12d via channel adapters (hereinafter, "CAs") 131e, 132e, 131f, and 132f and is also connected to the DE unit 300 via DAs 121e, 122e, 121f, and 122f. In this instance, "CA" means an adaptor on the channel side and "DA" means an adaptor on the device side. The CM 100e includes a memory 115e, a CPU0 111e, and a CPU1 112e. The CM 100f includes a memory 115f, a CPU0 111f, and a CPU1 112f.

The CMs 100e and 100f are connected to each other so that the CMs may communicate with each other. Specifically, the CM 100e may access the DE unit 300 via the DA 121e or the DA 122e. Furthermore, the CM 100e may also access the DE unit 300 via the DA 121f or the DA122f. Similarly, the CM 100f may access the DE unit 300 via any of the DAs 121e, 122e, 121f, and 122f. In other words, the disk array apparatus 20 illustrated in FIG. 3 uses quadruplicated access paths to disks.

In some cases, the CM 100e and the CM 100f are not connected to each other depending on the design of the disk array apparatus. In such a case, the CM 100e accesses the DE unit 300 via either the DA 121e or the DA 122e and the CM 100f accesses the DE unit 300 via the DA 121f or the DA 122f. In other words, when the CM 100e is not connected to the CM 100f in FIG. 3, the access paths to the disks are duplicated.

Assuming that the disk array apparatus 20 is externally provided with a plurality of disks, the DA 121e and similar components serve as hardware. When the disk array apparatus 20 is internally provided with a plurality of disks, the DA 121e and similar components serve as software. In the first embodiment, it is assumed that those components serve as hardware. The disk array apparatus according to the embodiment of the present technique is not limited to the case. The disk array apparatus 20 may be provided with disks externally or internally, i.e., in any form.

The entire configuration of a disk array apparatus 30 illustrated in FIG. 4 will now be described. Referring to FIG. 4, the disk array apparatus 30 is connected to the DEs 310 to 340 via DAs 121g, 122g, 121h, . . . , and 122j or through routers. CMs 100g to 100j are connected to a host 12 via a fibre channel (FC) switch 13. The CM 100g includes a CA 131g, a CA 132g, a CPU0 111g, a CPU1 112g, and a memory 115g. The CM 100h includes a CA 131h, a CA 132h, a CPU0 111h, a CPU1 112h, and a memory 115h. The CM 100i includes a CA 131i, a CA 132i, a CPU0 111i, a CPU1 112i, and a memory 115i. The CM 100j includes a CA 131j, a CA 132j, a CPU0 111j, a CPU1 112j, and a memory 115j. The DEs 310 to 340 include hot spares (hereinafter, "HSs") 310h to 340h, respectively.

The CMs 100g to 100j illustrated in FIG. 4 are connected to each other so that the CMs may communicate with each other. In other words, in the case illustrated in FIG. 4, the CM 100g may access the DEs 310 to 340 via any of the DAs 121g to 121j and 122g to 122j. Similarly, each of the CMs 100h to 100j may access the DEs 310 to 340 via any of the DAs 121g to 121*j* and 122*g* to 122*j*. In other words, the disk array apparatus 30 illustrated in FIG. 4 uses octuplicated access paths to disks.

(Configuration of Each CM)

Figure 5:
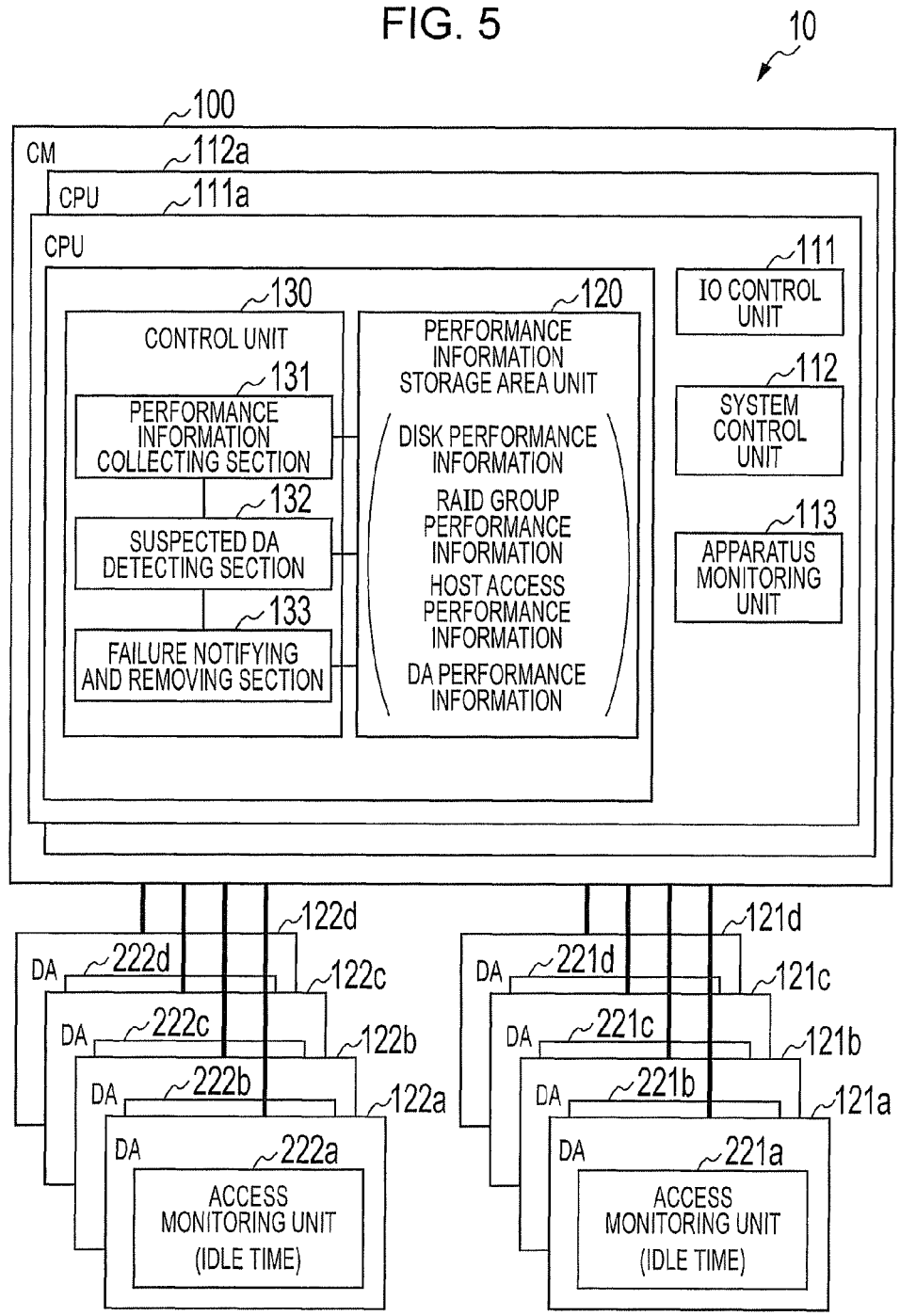
FIG. 5 is a block diagram illustrating the configuration of the disk array apparatus according to the first embodiment.

The configuration of each CM included in the disk array apparatus 10 according to the first embodiment will now be described with reference to FIG. 5. FIG. 5 is a block diagram illustrating the configuration of the disk array apparatus 10 according to the first embodiment. In FIG. 5, a CM 100 corresponds to each of the CMs 100*a* to 100*d* illustrated in FIG. 1. As illustrated in FIG. 5, the CM 100 accesses the DE unit 300 (not illustrated) via any of the DAs 121*a* to 121*d* and the DAs 122*a* to 122*d*.

The DAs 121*a* to 121*d* include access monitoring units 221*a* to 221*d*, respectively. The DAs 122*a* to 122*d* include access monitoring units 222*a* to 222*d*, respectively. The access monitoring units 221*a* to 221*d* and 222*a* to 222*d* cumulatively count idle times of the DAs 121*a* to 121*d* and 122*a* to 122*d*, respectively. For example, the access monitoring unit 221*a* cumulatively counts idle time of the DA 121*a*. The access monitoring unit 222*a* cumulatively counts idle time of the DA 122*a*.

Counting idle time will now be concretely described with reference to FIG. 6. FIG. 6 is a diagram explaining the access monitoring unit 221*a*. Referring to FIG. 6, the access monitoring unit 221*a* counts 50 milliseconds, as idle time of the DA 121*a*, out of 1000 milliseconds.

Referring again to FIG. 5, the CM 100 includes the CPUs 111*a* and 112*a*, an input-output (IO) control unit 111, a system control unit 112, an apparatus monitoring unit 113, a performance information storage area unit 120, and a control unit 130. In FIG. 5, the two CPUs 111*a* and 112*a* are illustrated on the assumption that redundancy for the CPUs is provided. The CPUs 111*a* and 112*a* have the same configuration.

The IO control unit 111 controls input and output from/to the upper apparatus (host) 12. The system control unit 112 controls the disk array apparatus 10. The apparatus monitoring unit 113 monitors a state of the disk array apparatus 10. These components are included in the disk array apparatus 10.

The disk array apparatus 10 according to the first embodiment includes the above-described IO control unit 111, the system control unit 112, and the apparatus monitoring unit 113, and further includes the control unit 130. The control unit 130 stores, manages, and determines a disk access status. Specifically, the control unit 130 includes a performance information collecting section 131, a suspected DA detecting section 132, and a failure notifying and removing section 133, as illustrated in FIG. 5.

The performance information collecting section 131 collects information items regarding the performances of the respective DAs. For example, the performance information collecting section 131 periodically collects performance information from each DA or from each of same-path DAs and stores the collected performance information into the performance information storage area unit 120. The performance information stored in the performance information storage area unit 120 is used for a process by the suspected DA detecting section 132.

Specifically, the performance information collecting section 131 directs the DAs 121*a* to 121*d* and 122*a* to 122*d* to transmit information indicating idle time or the like, thus acquiring information items indicating idle times cumulatively counted by the access monitoring units 221*a* to 221*d* and 222*a* to 222*d*. After that, the performance information collecting section 131 calculates a busy ratio of each of the DAs 121*a* to 121*d* and 122*a* to 122*d* on the basis of the acquired information.

The performance information collecting section 131 will now be described concretely with reference to FIG. 7. FIG. 7 is a diagram explaining the performance information collecting section 131. It is assumed that the performance information collecting section 131 has acquired information items illustrated in FIG. 6. As illustrated in FIG. 7, the performance information collecting section 131 calculates "95" as an operating ratio (busy ratio) of the DA 121*a*. Specifically, the performance information collecting section 131 subtracts an idle time of "50" from the total time of "1000" acquired from the access monitoring unit 221*a*. The performance information collecting section 131 divides the obtained value of "950" by the total time of "1000" and then multiplies the resultant value by "100", thus obtaining "95" as a busy ratio. Similarly, the performance information collecting section 131 calculates "10", "5", . . . , and "5" as busy ratios of the DAs 122*a*, 121*b*, . . . , and 122*d*.

The first embodiment uses the above-described method of cumulatively counting idle time through the access monitoring units 221*a* to 221*d* and 222*a* to 222*d* included in the respective DAs and calculating, through the performance information collecting section 131, busy ratios of the respective DAs on the basis of the idle times acquired from the respective access monitoring units. The disk array apparatus disclosed in the present technique is no limited to the above-described case. For example, in the disk array apparatus disclosed in the present technique, each access monitoring unit may cumulatively count idle time and further calculate a busy ratio and the performance information collecting section 131 may directly acquire the busy ratio from each access monitoring unit. In addition, in the disk array apparatus disclosed in the present technique, the performance information collecting section 131 may directly collect information regarding idle time from each DA.

The suspected DA detecting section 132 compares information items, collected from the respective DAs through the performance information collecting section 131, between DAs corresponding to same-path DAs, thus detecting a suspected DA that is suspected of having a performance failure on the basis of a result of comparison.

For example, the suspected DA detecting section 132 acquires information items (regarding busy ratios in the first embodiment), collected from the respective DAs through the performance information collecting section 131, from the performance information storage area unit 120. Subsequently, the suspected DA detecting section 132 compares the highest busy ratio with the second highest one of a plurality of DAs corresponding to same-path DAs. If there is a difference therebetween such that the highest busy ratio is more than n times (n is a predetermined value separately set, for example, a value ranging from 2 to 5) the second highest one, the suspected DA detecting section 132 detects the DA having the highest busy ratio as a suspected DA.

Alternatively, for example, the suspected DA detecting section 132 may acquire information items (regarding busy ratios in the first embodiment), collected from the respective DAs through the performance information collecting section 131, from the performance information storage area unit 120, compare the busy ratio of a predetermined DA of a plurality of DAs corresponding to same-path DAs with a mean busy ratio of the same-path DAs, and detect the predetermined DA as a suspected DA when there is a difference of a predetermined value or more therebetween.

The suspected DA detecting section 132 will now be described concretely with reference to FIG. 8. FIG. 8 is a diagram explaining the suspected DA detecting section 132. Referring to FIG. 8, the DAs 121a and 122a are same-path DAs, the DAs 121b and 122b are same-path DAs, the DAs 121c and 122c are same-path DAs, and the DAs 121d and 122d are same-path DAs. In this case, the suspected DA detecting section 132 compares busy ratios of the DAs 121a and 122a. Similarly, the suspected DA detecting section 132 compares busy ratios of the DAs 121b and 122b, those of the DAs 121c and 122c, and those of the DAs 121d and 122d.

In FIG. 8, since the busy ratio, "95", of the DA 121a is more than five times the busy ratio, "10", of the DA 122a, the suspected DA detecting section 132 detects the DA 121a with the busy ratio of "95" as a suspected DA.

Subsequently, the suspected DA detecting section 132 accumulates detection information related to the detected suspected DA as a point in an adding manner. The accumulation will be described with reference to FIG. 8. When detecting the DA 121a as a suspected DA, the suspected DA detecting section 132 accumulates detection information related to the DA No "121a" as "1" in the performance information storage area unit 120 in an adding manner.

Comparison by the suspected DA detecting section 132 will now be described with respect to a case where access paths are triplicated or more. For example, it is assumed that the eight DAs 121a, 122a, . . . , and 122d are same-path DAs in FIG. 8. In this case, the suspected DA detecting section 132 compares the highest busy ratio, "95", with the second highest busy ratio, "15". As a result of comparison, there is a difference between the busy ratios such that the highest busy ratio is more than five times the second highest one. Consequently, the suspected DA detecting section 132 detects the DA 121a with the busy ratio of "95" as a suspected DA.

So long as an added point value indicating the number of information accumulated by the suspected DA detecting section 132 exceeds a predetermined threshold value, the failure notifying and removing section 133 sends notification information notifying that a suspected DA is detected and removes the suspected DA from access path targets. For example, the failure notifying and removing section 133 outputs notification information to a predetermined output unit, such as a display or a speaker, or transmits the information to a predetermined destination, e.g., a system administrator.

In other words, the failure notifying and removing section 133 continuously monitors a suspected DA, detected by the suspected DA detecting section 132, within a predetermined period of time. When the failure notifying and removing section 133 may determine that the suspected DA really has a failure, the failure notifying and removing section 133 performs alarm notification and disconnects the suspected DA. For instance, the failure notifying and removing section 133 confirms an added point value, indicating the number of information accumulated in the performance information storage area unit 120 through the suspected DA detecting section 132, for each DA. When the point value exceeds the threshold value for enabling failure determination on the basis of the ratio of the added point value for failure detection to the number of confirmation times, the failure notifying and removing section 133 outputs or transmits notification information and disconnects the suspected DA. The above-described "threshold value for enabling failure determination" is a predetermined value set previously. For example, the value indicates "50 times out of 100 times". In this case, when detecting "50" times, as an added point value for failure detection, out of "100 times" as the number of confirmation times, the failure notifying and removing section 133 outputs or transmits notification information and disconnects the suspected DA.

In accordance with a separately set condition, the failure notifying and removing section 133 may perform various operations, for example, perform only output/transmission of notification information, perform disconnection of the suspected DA in addition to the output/transmission, or cancel the output/transmission and the disconnection. The failure notifying and removing section 133 may transmit a simple network management protocol (SNMP) trap in addition to notification information.

The performance information storage area unit 120 stores, for example, disk performance information, RAID group performance information, host access performance information, and DA performance information, as illustrated in FIG. 5. The disk performance information is information regarding the performances of respective disks.

The RAID group performance information includes information regarding the combination of disks constituting a RAID group and information indicating whether a read access to the RAID group is a sequential access or a random access.

The host access performance information is information regarding statuses of access from the upper apparatus to the disks. The DA performance information indicates the busy ratios of the respective DAs calculated by the performance information collecting section 131. Information stored in the performance information storage area unit 120 is not limited to the above-described items and may be changed appropriately in accordance with the operation form.

(Procedures of Processes Performed by the Disk Array Apparatus 10)

Figure 9:
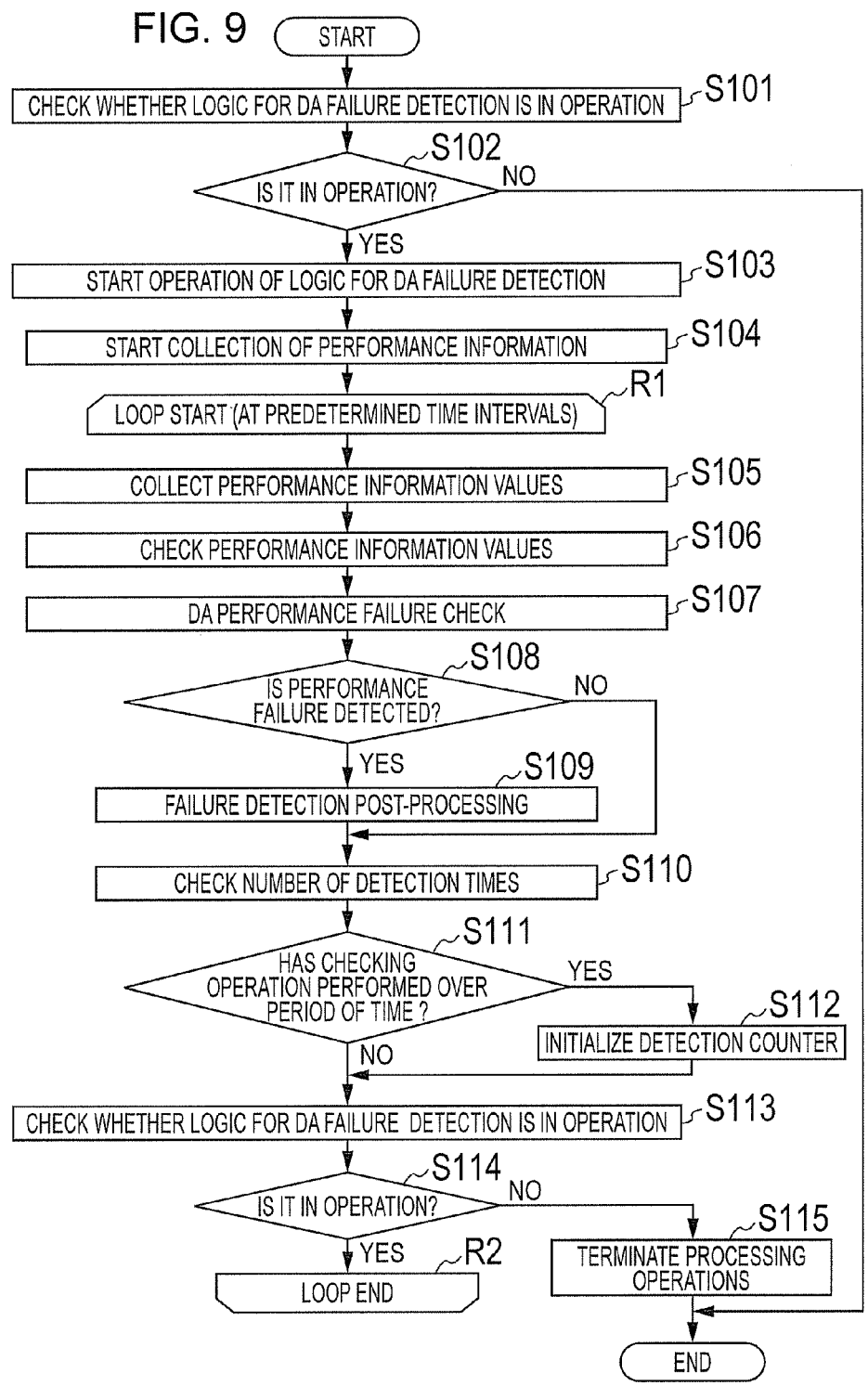
FIG. 9 is a flowchart illustrating operation determination and an overall flow.
Figure 10:
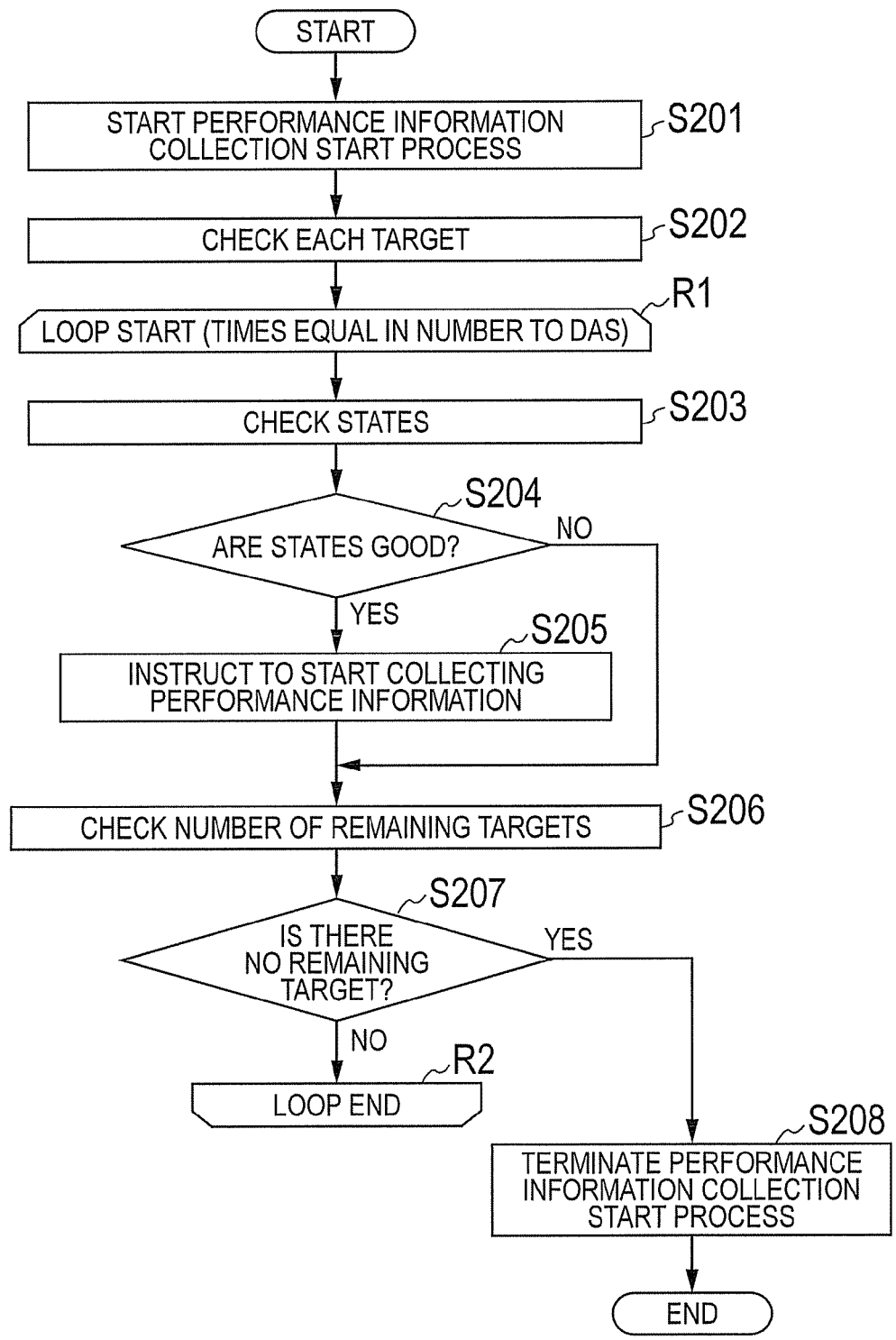
FIG. 10 is a flowchart illustrating a performance information collection start process.
Figure 11:
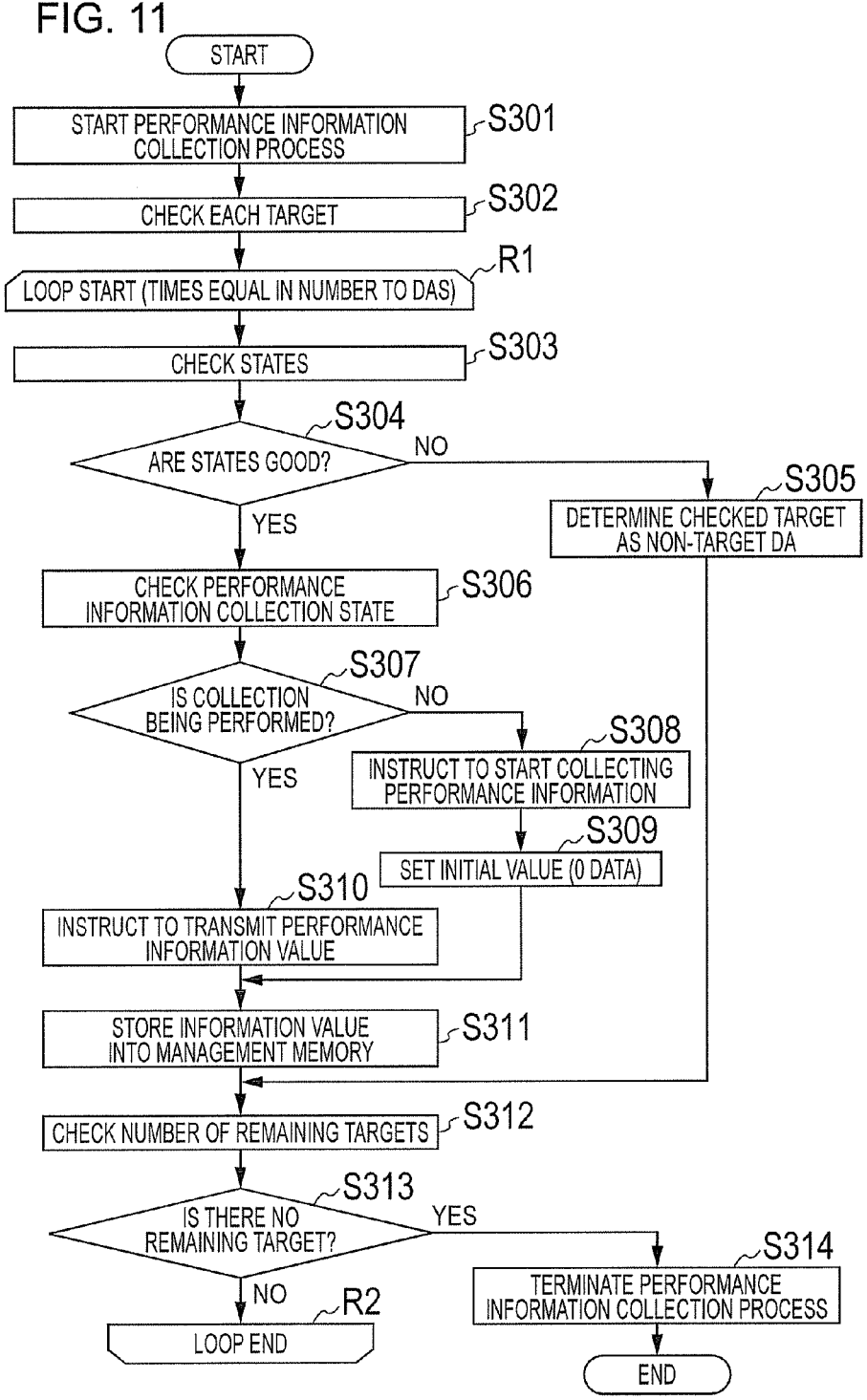
FIG. 11 is a flowchart illustrating a performance information value collection process.
Figure 12:
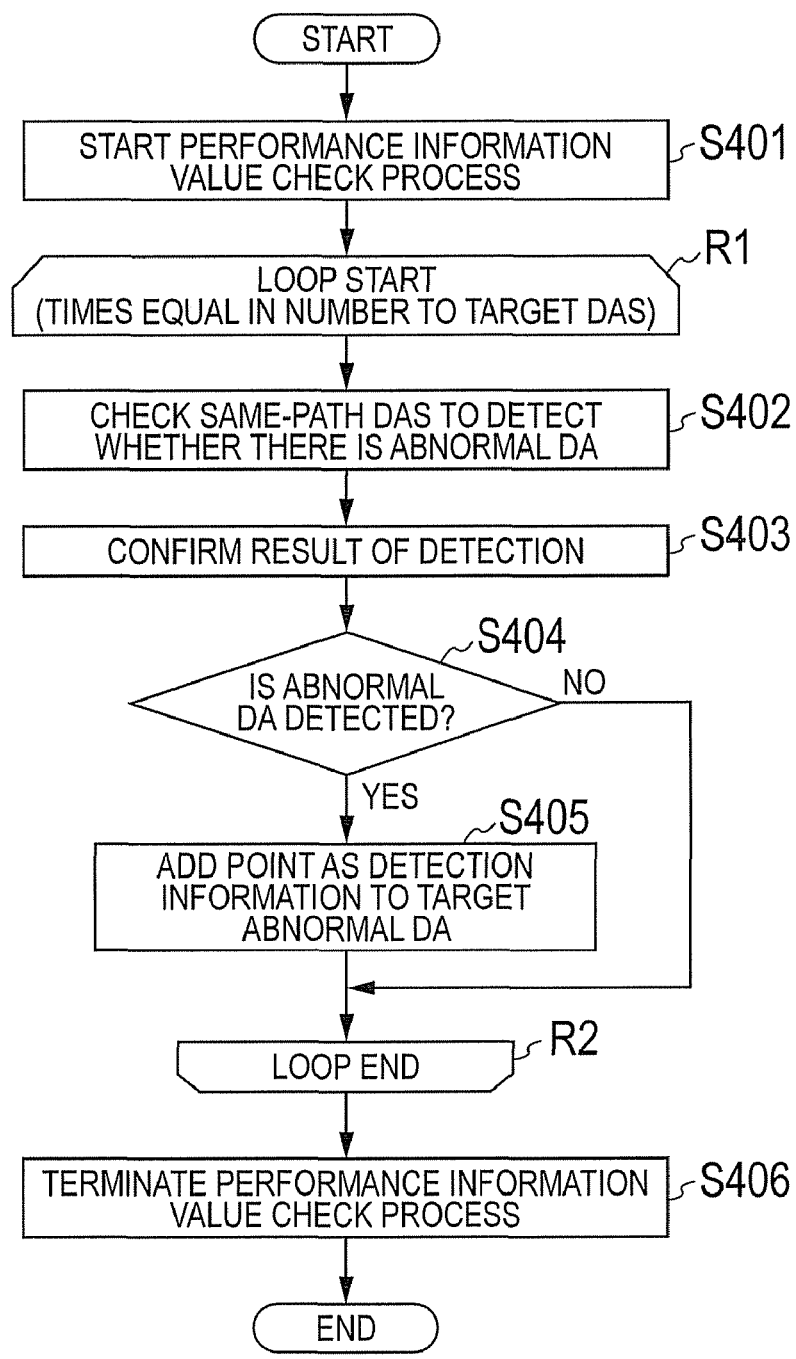
FIG. 12 is a flowchart illustrating a performance information value check process.
Figure 13:
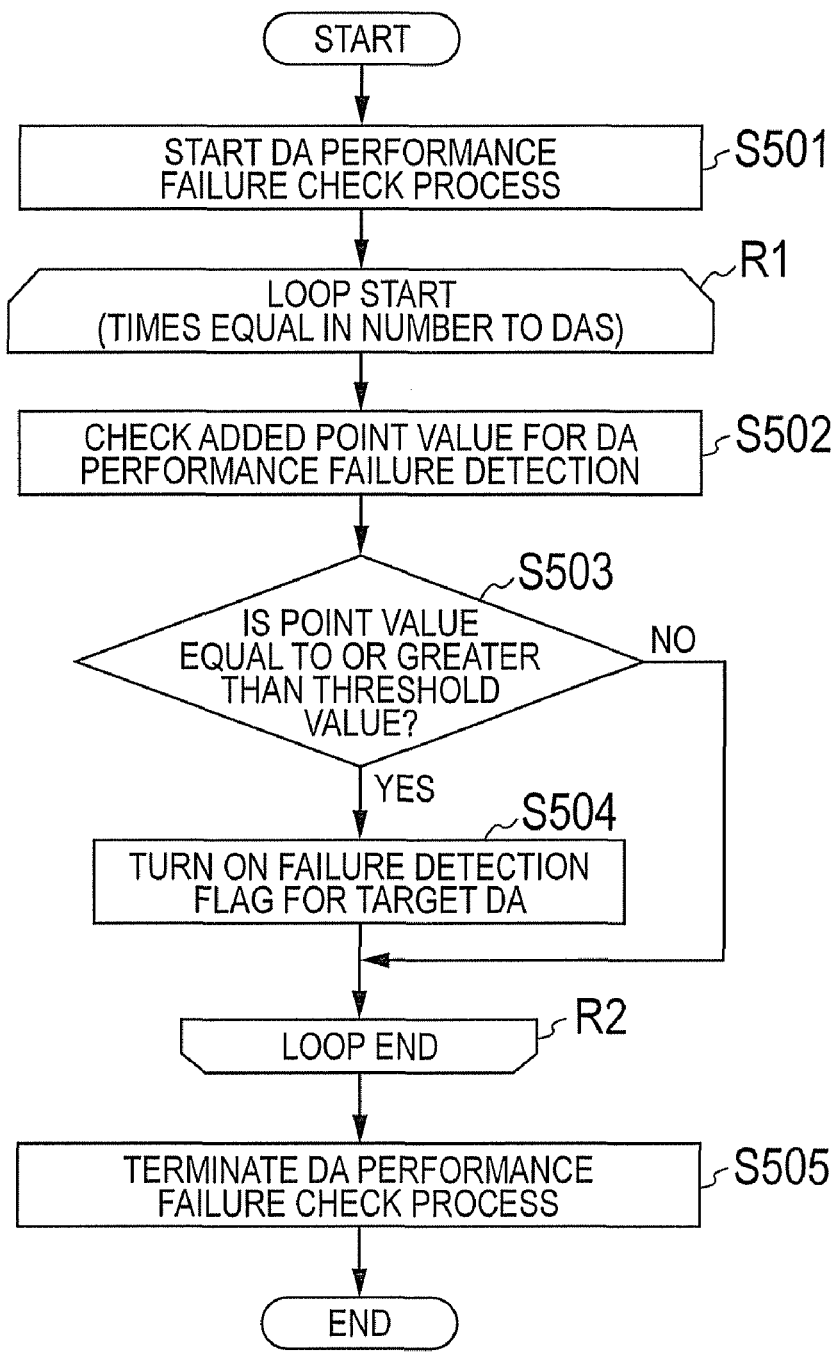
FIG. 13 is a flowchart illustrating a DA performance failure check process.
Figure 14:
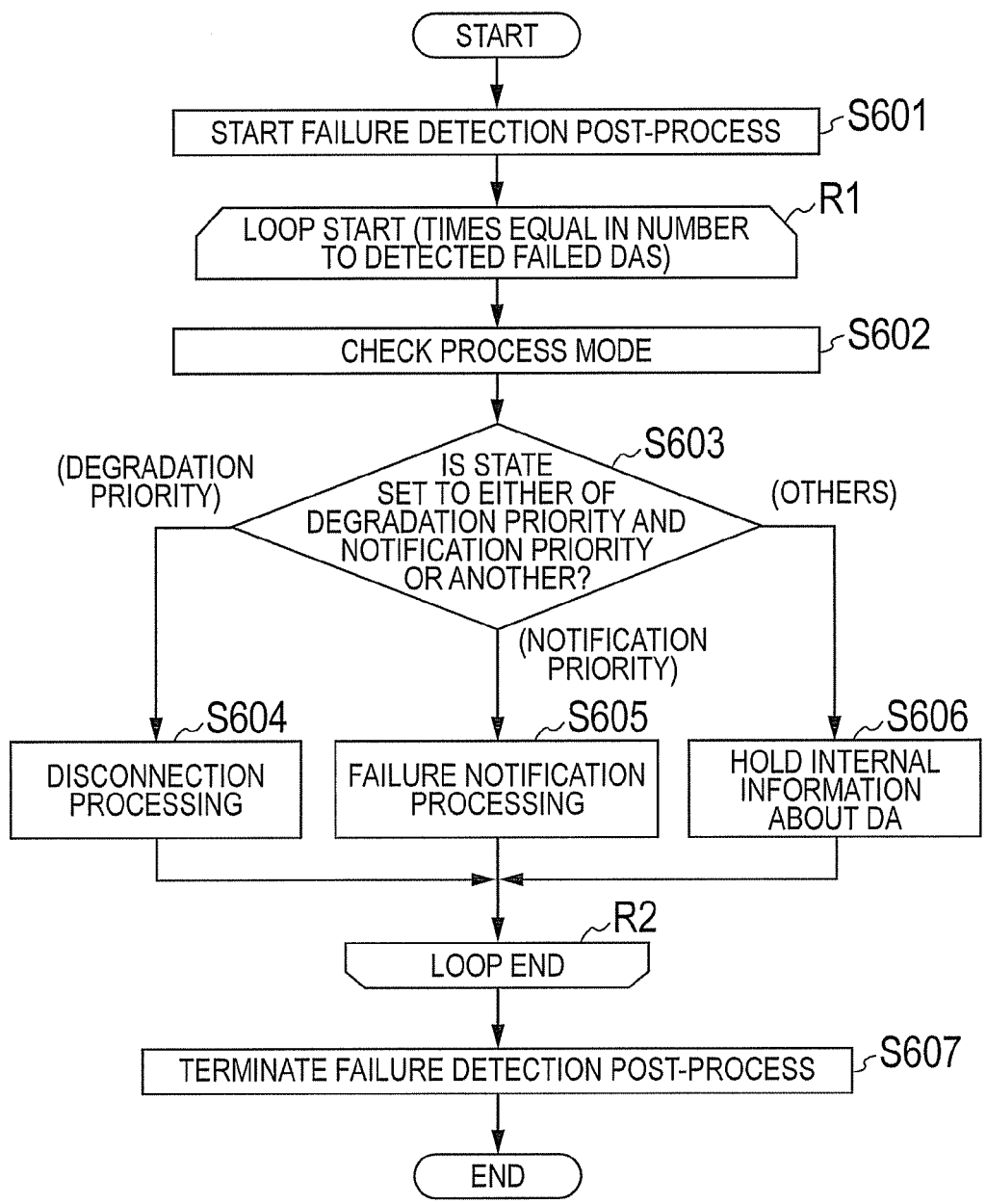
FIG. 14 is a flowchart illustrating a failure detection post-process.
Figure 15:
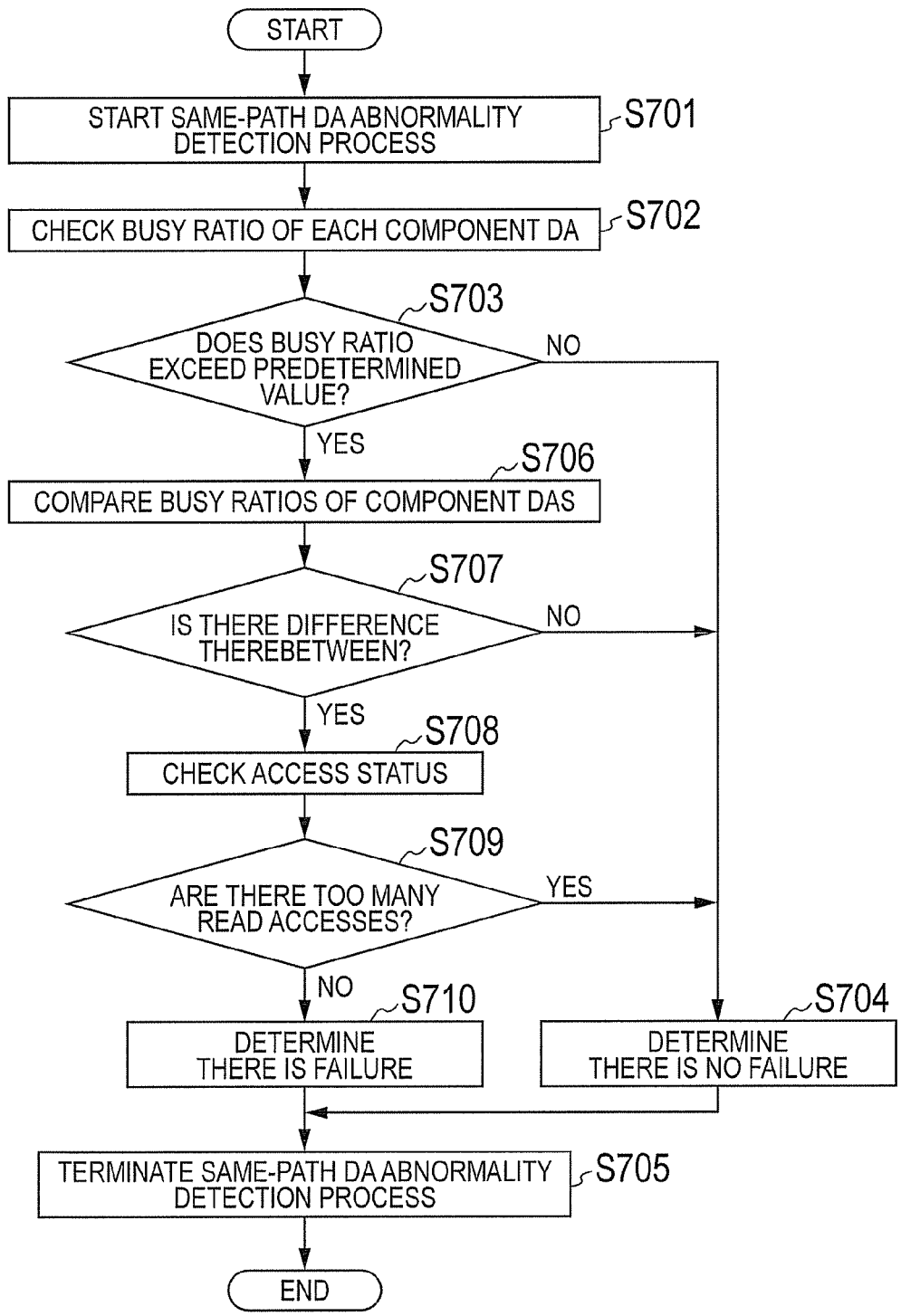
FIG. 15 is a flowchart illustrating a same-path DA abnormality detection process.

Processes performed by the disk array apparatus 10 according to the first embodiment will now be described with reference to FIGS. 9 to 15. FIG. 9 is a flowchart illustrating an operation determination and the entire flow. FIG. 10 is a flowchart illustrating a performance information collection start process. FIG. 11 is a flowchart illustrating a performance information value collection process. FIG. 12 is a flowchart illustrating a performance information value check process. FIG. 13 is a flowchart illustrating a DA performance failure check process. FIG. 14 is a flowchart illustrating a failure detection post-process. FIG. 15 is a flowchart illustrating a same-path DA failure detection process.

(Operation Determination and an Overall Flow (FIG. 9))

Since whether a process for detecting a suspected DA is performed is predetermined in the disk array apparatus 10, the CM 100 first checks whether logic for DA failure detection (detection of a suspected DA that is suspected of having a performance failure) is in operation (operation S101). In other words, the CM 100 checks whether it is in an operation state ready to perform processing for detecting a suspected DA in operation S101.

If it is not in operation (NO in operation S102), namely, when operation setting is not performed, the logic for DA failure detection is not in operation. Accordingly, the CM 100 terminates the process. Whereas, if it is in operation (YES in operation S102), the CM 100 starts the operation of the logic for DA failure detection (operation S103).

After starting the operation of the logic for DA failure detection, the CM 100 first performs performance information collection start processing (operation S104). Specifically, the CM 100 requests the performance information collecting section 131 to start collection of performance information from each DA. The performance information collection start processing will be described in detail later with reference to FIG. 10.

After the start of the collection of performance information by the performance information collecting section 131, the CM 100 repeats processing steps in a loop R1-R2 in FIG. 9 at predetermined time intervals. Specifically, the performance information collecting section 131 first collects performance information values of each DA (operation S105). In this instance, the performance information values indicate idle time of the DA, a busy ratio (DA performance information) calculated on the basis of the idle time, and RAID group performance information stored in the above-described performance information storage area unit 120. Processing of collecting performance information values will be described in detail later with reference to FIG. 11.

Subsequently, the suspected DA detecting section 132 checks the performance information values (operation S106). Specifically, the suspected DA detecting section 132 compares operation statuses of a plurality of DAs corresponding to same-path DAs on the basis of the information items collected from the respective DAs through the performance information collecting section 131. The suspected DA detecting section 132 detects a suspected DA that is suspected of having a performance failure on the basis of a result of comparison and adds a point for failure detection (hereinafter, "failure detection point") with respect to the detected suspected DA. Performance information value check processing will be described in detail below with reference to FIG. 12.

Next, the failure notifying and removing section 133 performs DA performance failure check processing (operation S107). Specifically, the failure notifying and removing section 133 performs failure determination (i.e., determines whether the detected DA suspected of having a performance failure actually has a failure) on the basis of an added point value for failure detection accumulated by the suspected DA detecting section 132. The DA performance failure check processing will be described in detail later with reference to FIG. 13.

The failure notifying and removing section 133 determines whether a performance failure is detected by the suspected DA detecting section 132 (operation S108). The "performance failure" means a case where it is further determined that the DA detected as a suspected DA actually has a failure. If a performance failure is detected (YES in operation S108), the failure notifying and removing section 133 performs failure detection post-processing (operation S109).

Specifically, the failure notifying and removing section 133 performs failure notification or recovery processing on the basis of a result of determination in operation S108. The "failure notification" means that notification information indicating detection of a suspected DA is output to a predetermined output unit or is transmitted to a predetermined destination. The "recovery processing" means removing the suspected DA from access path targets. The failure detection post-processing will be described in detail below with reference to FIG. 14.

If any performance failure is not detected in operation S108 (NO in operation S108), the failure notifying and removing section 133 does not perform the above-described processing in operation S109.

Subsequently, the CM 100 checks the number of detection times (operation S110) to determine whether the checking operation has been performed over a period of time (operation S111). If the checking operation has been performed over the period of time (YES in operation S111), a detection counter is initialized (operation S112). Whereas, if the checking operation has not been performed over the period of time (NO in operation S111), the detection counter is not initialized.

Then, the CM 100 checks whether the logic for DA failure detection is in operation (operation S113). If it is not in operation (NO in operation S114), namely, if the operation setting is cancelled, the CM 100 terminates respective processing operations (operation S115), thus terminating the process. Whereas, if it is in operation (YES in operation S114), the CM 100 repeats the processing steps in the loop R1-R2 in FIG. 9.

(Performance Information Collection Start Processing (FIG. 8))

The performance information collection start processing (hereinafter, "process") in operation S104 in FIG. 9 will now be described in detail below. First, the performance information collecting section 131 starts the performance information collection start process (operation S201) to check each DA, serving as a performance information collection target (operation S202).

After checking the target DA starts, the CM 100 repeats processing steps in a loop R1-R2 in FIG. 10 a plurality of times equal in number to the target DAs. Specifically, the performance information collecting section 131 first checks an installation state and an operation state of each DA (operation S203).

As a result of checking, if the states are good (YES in operation S204), the performance information collecting section 131 issues an instruction to start collecting performance information (operation S205). Specifically, the performance information collecting section 131 instructs each module to start collecting performance information from each DA. If the states are not good in operation S204 (NO in operation S204), the performance information collecting section 131 does not perform the above-described processing in operation S205.

Subsequently, the performance information collecting section 131 checks the number of remaining DAs, serving as the performance information collection targets (operation S206). If there is no remaining DA (YES in operation S207), the performance information collection start process is terminated (operation S208).

(Processing of Collecting Performance Information Values (FIG. 11))

The processing of collecting performance information values (hereinafter, also referred to as "performance information collection process") in operation S105 in FIG. 9 will now be described in detail. First, the performance information collecting section 131 starts the performance information collection process (operation S301) to check each DA, serving as a performance information collection target (operation S302).

After checking the target DA is started, the CM 100 repeats processing steps in a loop R1-R2 in FIG. 11 a plurality of times equal in number to the DAs. Specifically, the performance information collecting section 131 first checks an installation state and an operation state of each DA (operation S303).

As a result of checking, if the states are not good (NO in operation S304), that is, when the target DA is not installed, the DA fails, or the DA is turned off, the performance information collecting section 131 determines the DA as a non-target DA (operation S305), thus skipping the DA.

Whereas, if the states are good (YES in operation S304), the performance information collecting section 131 checks a performance information collection state (operation S306). Specifically, the performance information collecting section 131 performs restart processing for a case where the DA state is changed from an uninstalled state to an installed state or where the DA is returned to an active state from a failed state.

In this instance, when performance information collection is not being performed (NO in operation S307), the performance information collecting section 131 issues an instruction to start collecting performance information (operation S308) and sets an initial value (operation S309). Whereas, if performance information collection is being operated (YES in operation S307), the performance information collecting section 131 issues an instruction to transmit a performance information value (operation S310). In other words, the performance information collecting section 131 instructs the target DA to transmit the performance information value. In this instance, the performance information value represents idle time of the DA.

The performance information collecting section 131 stores the performance information value into a management memory (operation S311). Specifically, the performance information collecting section 131 stores the performance information value into a cache memory in the CM 100 or the performance information storage area unit 120.

Subsequently, the performance information collecting section 131 checks the number of remaining DAs, serving as performance information collection targets (operation S312). If there is no remaining DA (YES in operation S313), the performance information collecting section 131 terminates the performance information collection process (operation S314). In addition to idle time transmitted from each target DA, the performance information collecting section 131 appropriately stores a busy ratio calculated on the basis of the idle time and RAID group performance information stored in the above-described performance information storage area unit 120 as performance information values. These performance information values are appropriately combined if desired and are then used.

(Performance Information Value Check Processing (FIG. 12))

The performance information value check processing (hereinafter, "process") in operation S106 in FIG. 9 will be described in detail. First, the suspected DA detecting section 132 starts the performance information value check process (operation S401).

After the performance information value check process is started, the suspected DA detecting section 132 repeats processing steps in a loop R1-R2 in FIG. 12 a plurality of times equal in number to DAs corresponding to same-path DAs. Specifically, the suspected DA detecting section 132 performs same-path DA abnormality detection processing (operation S402). In other words, the suspected DA detecting section 132 checks a plurality of DAs controlling the same access path to detect whether there is an abnormal DA. The same-path DA abnormality detection processing will be described in detail later with reference to FIG. 15.

Subsequently, the suspected DA detecting section 132 confirms a result of detection (operation S403). If an abnormal DA is detected (YES in operation S404), a point is added as detection information to the target abnormal DA (operation S405). In other words, the suspected DA detecting section 132 accumulates detection information for the detected abnormal DA as a point in an adding manner.

After that, the suspected DA detecting section 132 terminates the performance information value check process (operation S406).

(DA Performance Failure Check Processing (FIG. 13))

The DA performance failure check processing (hereinafter, "process") in operation S107 in FIG. 9 will now be described in detail. First, the failure notifying and removing section 133 starts the DA performance failure check process (operation S501).

After starting the DA performance failure check process, the failure notifying and removing section 133 repeats processing steps in a loop R1-R2 in FIG. 13 a plurality of times equal in number to DAs. Specifically, the failure notifying and removing section 133 first checks an added point value for DA performance failure detection (operation S502). In other words, the failure notifying and removing section 133 checks an added point value indicating the number of accumulated detection information for an abnormal DA detected by the suspected DA detecting section 132.

When the checked point value is equal to or greater than a predetermined threshold value (YES in operation S503), the failure notifying and removing section 133 turns on a failure detection flag for the target DA (operation S504). If the point value is not equal to or greater than the threshold value (NO in operation S503), the failure notifying and removing section 133 does not perform the above-described processing in operation S504.

After that, the failure notifying and removing section 133 terminates the DA performance failure check process (operation S505).

(Failure Detection Post-Processing (FIG. 14))

The failure detection post-processing (hereinafter, "process") in operation S109 in FIG. 9 will now be described in detail. First, the failure notifying and removing section 133 starts the failure detection post-process (operation S601).

After starting the failure detection post-process, the failure notifying and removing section 133 repeats processing steps in a loop R1-R2 in FIG. 14 a plurality of times equal in number to DAs detected as failed DAs. In this case, a "DA detected as a failed DA" means a DA with a failure detection flag turned on by the failure notifying and removing section 133 among DAs detected as suspected DAs by the suspected DA detecting section 132.

Specifically, the failure notifying and removing section 133 first checks a process mode because the failure notifying and removing section 133 depends on a set state of the disk array apparatus 10 (operation S602). If the state is set to degradation priority, the failure notifying and removing section 133 performs disconnection processing (operations S603 and S604). Specifically, the failure notifying and removing section 133 removes the suspected DA with the failure detection flag on from access path targets.

If the state is set to notification priority, the failure notifying and removing section 133 performs failure notification processing (operation S605). Specifically, the failure notifying and removing section 133 outputs notification information to a predetermined output unit, or transmits the notification information to a predetermined destination. The notification information indicates that the suspected DA with the failure detection flag on is detected. For example, the failure notifying and removing section 133 allows a display to display the notification information, allows a speaker to output the information as speech, or transmits the information as a mail to a monitoring system for the disk array apparatus 10.

If the state is set to another setting other than the degradation priority and the notification priority, the failure notifying and removing section 133 holds internal information about the suspected DA detected (operation in S606). Specifically, the failure notifying and removing section 133 holds internal information about the suspected DA with the failure detection flag on.

After that, the failure notifying and removing section 133 terminates the failure detection post-process (operation S607).

(Same-Path DA Abnormality Detection Processing (FIG. 15))

The same-path DA abnormality detection processing (hereinafter, "process") in operation S402 in FIG. 12 will now be described in below. First, the suspected DA detecting section 132 starts the same-path DA abnormality detection process of checking DAs controlling the same access path to detect an abnormal DA (operation S701).

Subsequently, the suspected DA detecting section 132 checks a busy ratio of each same-path DA (component DA) (operation S702) to determine whether the busy ratio exceeds a predetermined value (operation S703). Specifically, the suspected DA detecting section 132 determines whether at least one of the DAs, corresponding to the same-path DAs, subjected to the process has a busy ratio exceeding the predetermined value.

When the number of DAs corresponding to the same-path DAs is two or more, the suspected DA detecting section 132 compares the busy ratios in operation S702. In other words, when the number of DAs corresponding to the same-path DAs is one, the suspected DA detecting section 132 does not check the busy ratio and terminates the process. This is because the busy ratio of the DA may rise when the access path is not subjected to redundancy. It is also because the DA is prevented from being removed from access path targets.

The above-described determination processing will be described with reference to FIG. 2. Referring to FIG. 2, the DAs 121*a* and 122*a* are the same-path DAs. Accordingly, when the DAs 121*a* and 122*a* are processing target same-path DAs, the suspected DA detecting section 132 determines whether either the busy ratio of the DA 121*a* or that of the DA 122*a* exceeds the predetermined value.

If the busy ratio of each of the DAs corresponding to the same-path DAs does not exceed the predetermined value (NO in operation S703), the suspected DA detecting section 132 determines that the DAs corresponding to the same-path DAs have no failure (operation S704). The suspected DA detecting section 132 then terminates the same-path DA abnormality detection process (operation S705).

The reason why the determination is made as described above will be explained. For example, it is assumed that the DAs 121*b* and 122*b* are same-path DAs, as illustrated in FIG. 2. It is further assumed that the busy ratio of the DA 121*b* is "5" and that of the DA 122*b* is "1". In this case, the busy ratio, "5", of the DA 121*b* is five times the busy ratio, "1", of the DA 122*b*. Accordingly, the DA 121*b* may have an abnormal performance. Typically, however, it is hard to consider that a busy ratio of "5" means an abnormal DA performance. Furthermore, when the busy ratios of the DAs are "5" and "1", the busy ratios of the same-path DAs seem to be sufficiently distributed. Accordingly, when the busy ratio of each of the DAs corresponding to the same-path DAs does not exceed the predetermined value, the suspected DA detecting section 132 determines that the DAs have no performance failure.

Whereas, even when the busy ratio of at least one of the DAs corresponding to the same-path DAs exceeds the predetermined value (YES in operation S703), the suspected DA detecting section 132 compares the busy ratios of the DAs corresponding to the same-path DAs (operation S706).

As a result of comparison, if there is no difference therebetween (NO in operation S707), the suspected DA detecting section 132 determines that there is no failure (operation S704) and then terminates the abnormal DA detection check process (operation S705). In other words, the suspected DA detecting section 132 compares the busy ratios of the DAs. When there is a difference therebetween such that the busy ratio of one DA is more than n times (n is a predetermined value separately set, for example, a value ranging from 2 to 5) the busy ratio of the other DA, the suspected DA detecting section 132 determines that there is no suspected DA and terminates the process.

The reason why the determination is made as described above will now be explained. When there is no difference between the busy ratios such that the busy ratio of one DA is more than n times that of the other DA, this means that the busy ratios of the same-path DAs are sufficiently distributed. For example, it is assumed that the DAs 121*b* and 122*b* are the same-path DAs, as illustrated in FIG. 2. It is further assumed that the busy ratio of the DA 121*b* is "90" and that of the DA 122*b* is "91". In this case, since the busy ratios of the DAs 121*b* and 122*b* are high, the DAs 121*b* and 122*b* seem to have a performance failure. However, since the busy ratio of the DA 121*b* is not so different from that of the DA 122*b*, the busy ratios of the same-path DAs are sufficiently distributed. Accordingly, even when the busy ratios of the DAs are high, the DAs may be temporarily under high load. It is therefore determined that both of the DAs have no performance failure.

Whereas, if there is a difference therebetween (YES in operation S707), the suspected DA detecting section 132 checks an access status (operation S708). Specifically, the suspected DA detecting section 132 compares the busy ratios of the DAs and, when there is a difference therebetween such that the busy ratio of one DA is more than n times than that of the other DA, checks the ratio of read accesses to write accesses, for example.

When there are too many read accesses (YES in operation S709), the suspected DA detecting section 132 determines that there is no failure (operation S704) and then terminates the same-path DA abnormality detection process (operation S705). Whereas, if there are not too many read accesses (NO in operation S709), the suspected DA detecting section 132 determines that there is a failure (operation S710) and then terminates the same-path DA abnormality detection process (operation S705).

The reason why an access status is checked in the above-described operation S708 will be described below. Even when access paths are subjected to redundancy, the disk array apparatus 10 accesses a disk only via a specific access path in some cases. For example, if a single read sequential access to large-size data has occurred, the disk array apparatus 10 performs a read access to the data via a specific access path without using distributed access paths. According to the same-path DA abnormality detection process, therefore, whether there is a suspected DA that is suspected of have a performance failure is detected by comparing the busy ratios of DAs and further checking a read access status of a DA. The suspected DA detecting section 132 determines, for example on the basis of the RAID group performance information stored in the performance information storage area unit 120, whether a single read sequential access has occurred.

As described above, the disk array apparatus 10 according to the first embodiment collects information items about the performances of DAs, serving as access paths to disks. The disk array apparatus 10 compares the collected information items of DAs controlling the same access path to detect a suspected DA that is suspected of having a performance failure on the basis of a result of comparison. Thus, the disk array apparatus 10 according to the first embodiment may appropriately detect a DA having a performance failure.

In the first embodiment, the busy ratios, each of which is obtained from idle time of a DA in a predetermined period of time, of the DAs are collected as the performance information items and the busy ratios are compared, thus detecting a suspected DA. Consequently, a performance failure may be appropriately detected.

In the first embodiment, when a suspected DA is detected, notification information indicating that the suspected DA is detected is output to a predetermined output unit or is transmitted to a predetermined destination through a communication unit. Thus, a performance failure may be appropriately countered.

In the first embodiment, when a suspected DA is detected, the suspected DA is removed from access path targets. Consequently, a performance failure may be appropriately addressed.

In the first embodiment, when a suspected DA is detected, information indicating the detection of the suspected DA is accumulated as a point in an adding manner. So long as a point value indicating the number of accumulated information exceeds a predetermined threshold value, notification information is output or transmitted, alternatively, the suspected DA is removed. Consequently, a performance failure is detected more precisely and, after that, the performance failure may be appropriately handled.

The disk array apparatus disclosed in the present technique may be embodied in various forms in addition to the above-described embodiment. A disk array apparatus according to a second embodiment of the present technique will now be described.

In the disk array apparatus according to the foregoing first embodiment, a suspected DA is detected, information indicating the detection is accumulated as a point in an adding manner, and so long as a point value indicating the number of accumulated information exceeds a predetermined threshold value, notification and/or disconnection is performed. Specifically, in the above-described first embodiment, whether a DA, detected as a suspected DA that is suspected of having a performance failure, is actually abnormal is further determined. The disk array apparatus disclosed in the present technique is not limited to this case. For example, when detecting a suspected DA, the disk array apparatus may immediately notify that the suspected DA is a DA having a performance failure and/or disconnect the suspected DA, irrespective of whether a point value indicating the number of accumulated information exceeds the predetermined threshold value. Alternatively, the disk array apparatus may detect a suspected DA and hold information about the detected suspected DA as internal information without notifying that the suspected DA is detected or disconnecting the suspected DA.
(Comparison Processing)

The above-described first embodiment has been described on the assumption that it is desirable that the busy ratios of same-path DAs are substantially uniform. Specifically, in the first embodiment, it is assumed that the busy ratios of same-path DAs may be uniform. Accordingly, if there is a difference between the busy ratios of the same-path DAs such that the busy ratio of one DA is more than n times that of another DA, the DA having the higher busy ratio is detected as a suspected DA. However, a disk array apparatus may be designed so that the busy ratios of same-path DAs are not uniform. For example, assuming that DAs 121 and 122 are same-path DAs, the DAs may be designed so that the ratio of the busy ratio of the DA 121 to that of the DA 122 is 2:1. In such a disk array apparatus, even when there is a difference between the busy ratios of the DAs 121 and 122, the DAs may have not have a performance failure.

If the disk array apparatus is designed so that the busy ratios of same-path DAs are not uniform, the disk array apparatus may correct the busy ratios and, after that, compare the busy ratios. For example, it is assumed that the same-path DAs 121 and 122 are designed so that the ratio of the busy ratio of the DA 121 to that of the DA 122 is 2:1, as described above. It is further assumed that the busy ratio of the DA 121 is "70" and that of the DA 122 is "40". In this case, the disk array apparatus may divide the busy ratio, "70", of the DA 121 by "2" and then compare the obtained value, "35", with the busy ratio, "40", of the DA 122. As a result of comparison, when there is a difference between the busy ratios of the DAs such that the busy ratio of one DA is more than n times that of the other DA, the DA having the higher busy ratio may be detected as a suspected DA.
(Explanations of a System)

As for the processes described in the first embodiment, a part or all of the processes described as being automatically performed may be manually performed. Alternatively, a part or all of the processes described as being manually performed may be automatically performed using a known method (for example, a threshold value used by the failure notifying and removing section may be automatically generated by internal processing performed in the disk array apparatus, or may be input by an operations manager of the disk array apparatus). In addition, the processing steps described in the specification and the drawings, the control procedures (FIGS. 9 to 15), the specific names, and information including various kinds of data and parameters may be arbitrarily changed, except as noted.

Furthermore, the components of each of the units illustrated are schematic functional elements. Each unit may not have a physical structure as illustrated. In other words, the concrete forms of separating or integrating the units are not limited to the forms illustrated in the diagrams (FIGS. 2 to 5). The units may be functionally or physically separated or integrated, in whole or in part, in arbitrary units depending on various loads and usage conditions. In addition, any part or all of the processing functions of the units may be achieved by a CPU and a program analyzed and implemented by the CPU, or achieved as hardware based on wired logic.
(Explanations of a Program)

Figure 16:
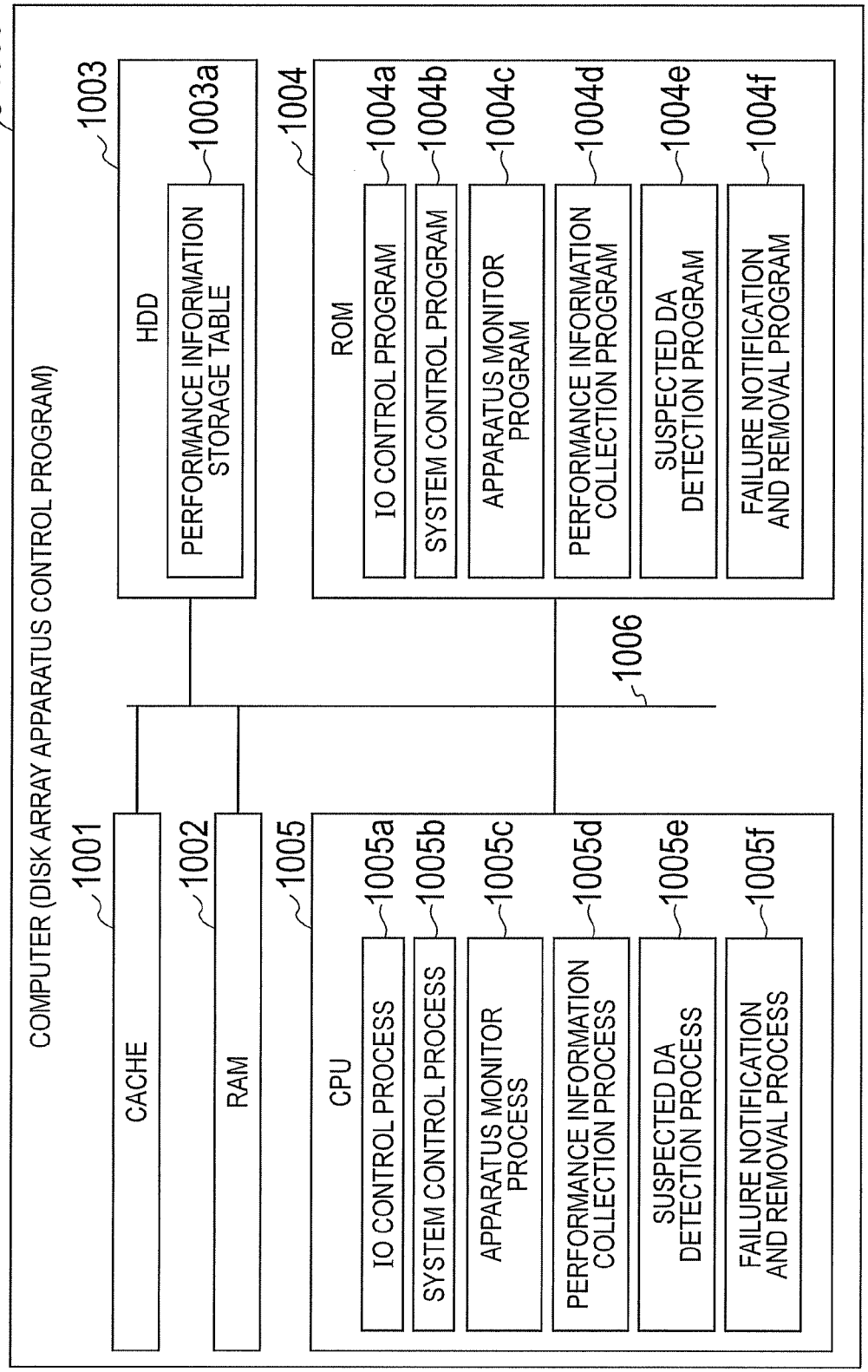
FIG. 16 is a diagram illustrating a computer that implements a control program for a disk array apparatus.

In addition, the various processes described in the first embodiment may be achieved by executing a previously prepared program through one or more computers such as a personal computer and a work station. An example of the computer executing a disk array apparatus control program having the same functions as those in the above-described first embodiment will be described below. FIG. 16 is a diagram illustrating the computer that implements the disk array apparatus control program.

Referring to FIG. 16, in the computer, indicated at 1000, a cache 1001, a RAM 1002, an HDD 1003, a ROM 1004, and a CPU 1005 are connected to a bus 1006. In this instance, the disk array apparatus control program exhibiting the same functions as those in the above-described first embodiment, namely, an IO control program 1004a, a system control program 1004b, an apparatus monitor program 1004c, a performance information collection program 1004d, a suspected DA detection program 1004e, and a failure notification and removal program 1004f are previously stored in the ROM 1004, as illustrated in FIG. 16.

The CPU 1005 reads and implements the respective programs 1004a to 1004f, so that the programs 1004a to 1004f provide an IO control process 1005a, a system control process 1005b, an apparatus monitor process 1005c, a performance information collection process 1005d, a suspected DA detection process 1005e, and a failure notification and removal process 1005f, respectively. The processes 1005a to 1005f correspond to the IO control unit 111, the system control unit 112, the apparatus monitoring unit 113, the performance information collecting section 131, the suspected DA detecting section 132, and the failure notifying and removing section 133 in FIG. 5, respectively.

The HDD 1003 includes a performance information storage table 1003a, as illustrated in FIG. 16. The performance information storage table 1003a corresponds to the performance information storage area unit 120 illustrated in FIG. 5.

The above-described programs 1004a to 1004f may not be stored in the ROM 1004. For example, the programs may be stored in a "portable physical medium" such as a flexible disk (FD), a compact disk read-only memory (CD-ROM), a magneto-optical (MO) disk, a digital versatile disk (DVD), or an integrated circuit (IC) card, a "fixed physical medium" such as a hard disk drive (HDD) internally or externally provided for the computer 1000, or "another computer (or server)" connected through a public circuit, the Internet, a local area network (LAN), or a wide area network (WAN). The computer 1000 may read the programs from the medium and implement the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage system comprising:
   a storage device that stores data;
   a pair of adapters connected with the storage device, each of the adapters transmitting and receiving the data to and from the storage device by using a same network path; and
   a controller, connected with the adapters, to collect operating ratios indicating performance of each of the adapters, to compare the collected operating ratios of the adapters with each other, and to detect a suspected adapter that is suspected of having a performance failure on the basis of a result of the comparison.

2. The storage system according to claim 1, wherein the controller collects operating ratios of each of the adapters as the information indicating performances of the adapters, each of the operating ratios being obtained from idle time of the corresponding adapter in a predetermined period of time, and the controller compares the collected operating ratios to detect a suspected adapter.

3. The storage system according to claim 1, wherein the controller outputs notification information indicating the detection of the suspected adapter to a predetermined output unit or transmits the information to a predetermined destination, when the controller detects a suspected adapter.

4. The storage system according to claim 1, wherein the controller removes the suspected adapter from access path targets, when the suspected adapter detecting unit detects a suspected adapter.

5. The storage system according to claim 3, wherein the controller accumulates information indicating the detection of the suspected adapter as a point in an adding manner when detecting a suspected adapter, and outputs or transmits notification information when a point value indicating the number of information accumulated by the controller exceeds a predetermined threshold value.

6. The storage system according to claim 4, wherein the controller accumulates information indicating the detection of the suspected adapter as a point in an adding manner when detecting a suspected adapter, and removes the adapter when a point value indicating the number of information accumulated by the suspected adapter detecting unit exceeds a predetermined threshold value.

7. A control method for controlling a storage system includes a storage system includes a storage device for storing data, and a controller connected with the adapters, the storage method comprising:
   collecting performance information indicating performance of each of the adapters, each of the adapters being connected with the storage device and transmitting and receiving the data to and from the storage device by using a same network path,
   collecting operating ratios indicating performance of each of the adapters;
   comparing the collected operating ratios of the adapters with each other; and
   detecting, by using the controller, a suspected adapter that is suspected of having a performance failure on the basis of a result of the comparison.

8. The control method according to claim 7, wherein the collecting operation collects operating ratios of each of the adapters as the information indicating performances of the adapters, each of the operating ratios being obtained from idle time of the corresponding adapter in a predetermined period of time, and the comparing operation compares the collected operating ratios to detect a suspected adapter.

9. A storage medium storing a control program for controlling a storage system includes a storage system includes a storage device for storing data, a pair of adapters connected with the storage device, each of the adapters transmitting and receiving the data to and from the storage device respectively, and a controller connected with the adapters, the control program causing a computer to execute an operation comprising:
   collecting performance information indicating performance of each of the adapters, each of the adapters being connected with the storage device and transmitting and receiving the data to and from the storage device by using a same network path,
   collecting operating ratios indicating performance of each of the adapters;
   comparing the collected operating ratios of the adapters with each other; and
   detecting, by using the controller, a suspected adapter that is suspected of having a performance failure on the basis of a result of the comparison.

10. The storage medium according to claim 9, wherein the collecting operation collects operating ratios of each of the adapters as the information indicating performances of the adapters, each of the operating ratios being obtained from idle time of the corresponding adapter in a predetermined period of time, and the comparing operation compares the collected operating ratios to detect a suspected adapter.

* * * * *

UNITED STATES PATENT AND TRADEMARK OFFICE
CERTIFICATE OF CORRECTION

PATENT NO. : 8,145,952 B2
APPLICATION NO. : 12/691985
DATED : March 27, 2012
INVENTOR(S) : Masahiro Yoshida Page 1 of 1

It is certified that error appears in the above-identified patent and that said Letters Patent is hereby corrected as shown below:

Column 20, Line 14-16, In Claim 7,

Delete "A control method for controlling a storage system includes a storage system includes a storage device for storing data, and a controller connected with the adapters, the storage method comprising:"

and insert -- A control method for controlling a storage system which includes a storage device for storing data, and a controller connected with the adapters, the storage method comprising: --, therefor.

Column 20, Line 36-38, In Claim 9,

Delete "A storage medium storing a control program for controlling a storage system includes a storage system includes a storage device for storing data,"

and insert -- A storage medium storing a control program for controlling a storage system which includes a storage device for storing data, --, therefor.

Signed and Sealed this
Twenty-ninth Day of May, 2012

David J. Kappos
*Director of the United States Patent and Trademark Office*